United States Patent
Kogan et al.

(10) Patent No.: US 6,751,664 B1
(45) Date of Patent: Jun. 15, 2004

(54) METHOD FOR MONITORING AND MEETING CUSTOMER BANDWIDTH DEMAND IN OPERATIONAL IP DATA NETWORKS

(75) Inventors: Yaakov Kogan, Fair Haven, NJ (US); Gangaji Maguluri, Morganville, NJ (US); Gomathi Ramachandran, Holmdel, NJ (US)

(73) Assignee: AT&T Corp., New York, NY (US)

( * ) Notice: Subject to any disclaimer, the term of this patent is extended or adjusted under 35 U.S.C. 154(b) by 719 days.

(21) Appl. No.: 09/609,215

(22) Filed: Jul. 5, 2000

(51) Int. Cl.$^7$ ............................................. G06F 13/00
(52) U.S. Cl. ..................... 709/224; 709/226; 709/238; 370/234
(58) Field of Search ................................ 709/217, 219, 709/224, 225, 226, 238, 239, 249, 250; 370/229, 230, 232, 234

(56) References Cited

U.S. PATENT DOCUMENTS

| | | | | |
|---|---|---|---|---|
| 5,684,960 A | * | 11/1997 | Geyer et al. ............ 395/200.11 |
| 6,052,361 A | * | 4/2000 | Ansari et al. ................ 370/232 |
| 6,359,863 B1 | * | 3/2002 | Varma et al. ................ 370/232 |
| 6,564,104 B2 | * | 5/2003 | Nelson et al. ................. 607/60 |
| 6,578,076 B1 | * | 6/2003 | Putzolu ....................... 709/223 |
| 6,594,268 B1 | * | 7/2003 | Aukia et al. ................. 370/400 |

OTHER PUBLICATIONS

U.S. patent application Ser. No. 09/116,129, Filed Jul. 15, 1998; Method and Apparatus for Fault Detection and Isolation in Data Networks; Inventor, D'Souza, Kevin., now pat. No. 6,173,324.

\* cited by examiner

Primary Examiner—Viet D. Vu

(57) ABSTRACT

Monitoring of customer bandwidth demand is accomplished by comparing mean access router uplink utilization to a prescribed threshold value that is computed based upon granular measurements of uplink utilization. This provides an indication of whether customer demand is met with a statistical level of confidence. Further, the actually measured access router uplink utilization can be used to make a predictive assessment of whether to provision a new customer on the access router without adversely affecting existing customers.

8 Claims, 2 Drawing Sheets

METHOD FOR MONITORING AND MEETING CUSTOMER BANDWIDTH DEMAND IN OPERATIONAL IP DATA NETWORKS

TECHNICAL FIELD

This invention relates to a technique for monitoring an IP data network to verify whether customer bandwidth demand (as constrained by access bandwidth limitations) is satisfied, as well as to determine whether to provision additional customers.

BACKGROUND ART

Providers of data communications services, such as AT&T, are currently experiencing increasing customer demand. For example, customers of AT&T now make use of its data network to transmit digitized voice, video, and multimedia, in addition to traditional numeric data. The increased volume of customer data has lead to increased demand for bandwidth. To that end, many large users of data communications services often require their service providers meet certain bandwidth requirements and impose financial penalties during intervals while such requirements go unsatisfied.

Heretofore, providers of IP data communications services have attempted to measure customer bandwidth demand in accordance with hourly measurements of link utilization and packet loss. Unfortunately, hourly link utilization measurements hide random fluctuations in bandwidth demand. Measuring packet loss fails to provide a proactive measure of a lack of bandwidth as often occurs after the customer bandwidth demand has been denied.

Thus, there is a need for a technique for measuring customer bandwidth demand that provides a more accurate determination of whether in fact customer demand is being met with a prescribed statistical level of confidence, thereby allowing for more accurate decision making regarding provisioning of new customers.

BRIEF SUMMARY OF THE INVENTION

Briefly, in accordance with a preferred embodiment of the invention, a method is provided for monitoring an IP data network to verify whether customer bandwidth demand (as constrained by access bandwidth limitations) is satisfied, as well as for determining whether to provision a new customer via a downlink to an access router connected via at least one uplink to other elements (e.g., hub routers) in a backbone IP data network. Periodically, the utilization of each uplink connecting the access router within the backbone data network is measured on a granular level, typically every 2–5 minutes. Thereafter, using these measurements the bandwidth fulfillment at each access router is verified in accordance with the given confidence level. Such a check is made by comparing whether the mean uplink utilization of the access router is less than a prescribed threshold value. If the bandwidth fulfillment at each router is satisfied (representing the potential for provisioning additional customers), then a check is made whether in fact a new customer can be provisioned while still maintaining bandwidth fulfillment requirements for both the new customer and the existing customers. Such a check is made by comparing whether the predicted link utilization, as established from the bandwidth usage of existing customers and the required bandwidth needed by the new customer, is less than a prescribed threshold value. If the predicted utilization value does not exceed the prescribed threshold value, then new customer provisioning can occur while still assuring adequate bandwidth for the existing customers. Otherwise, no new customer provisioning should occur.

BRIEF DESCRIPTION OF THE DRAWINGS

In accordance with a preferred embodiment of the invention.

DETAILED DESCRIPTION

Figure 1:
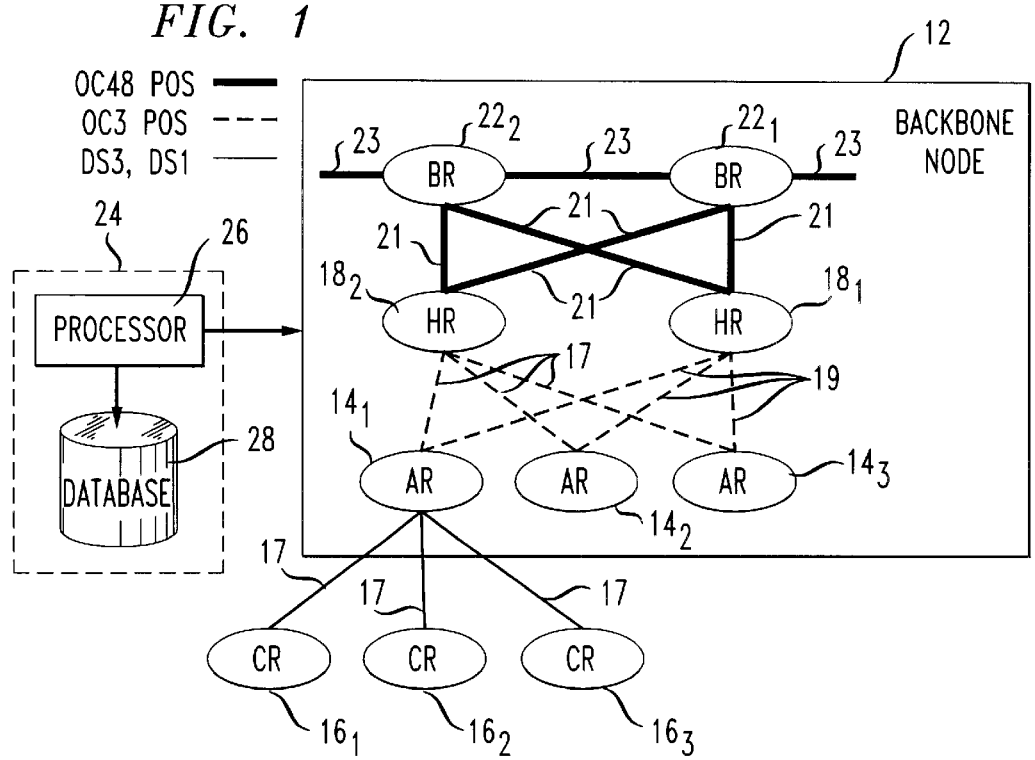
FIG. 1 illustrates a block schematic diagram of an apparatus for monitoring an IP data network to verify whether customer bandwidth demand (as constrained by access bandwidth limitations) is satisfied, as well as for determining whether to provision additional customers.

FIG. 1 discloses a part of an IP data communications network that includes a backbone node 12 within which is at least one, and typically a plurality of access routers (ARs) $14_1$, $14_2$, and $14_3$, which may comprise, for example, a Model 7500 router manufactured by Cisco Inc. Each of the ARs $14_1$, $14_2$, and $14_3$ typically receives traffic from at least one of customer reuters (CRs) $16_1$, $16_2$, and $16_3$, respectively lying outside the backbone node 12. In practce, each CR enjoys a DS1 or DS3 speed downlink 17 to its corresponding AR. Within the backbone node 12, each AR enjoys an uplink 19, which is an OC 3 or higher speed uplink, to one or more hub routers (HRs) such as hub routers $18_1$ and $18_2$. In turn, each HR enjoys an uplink 21, which is an $O_{C-48}$ or higher speed link, to one or more backbone routers (BRs), such as backbone routers $22_1$ and $22_2$ which have OC 48 or higher links 23—23 between them and to the backbone routers (not shown) in other backbone nodes (not shown).

Heretofore, provisioning (i.e., adding new) customers on each access router $14_1$ $14_2$ and $14_3$ has been somewhat of a hit or miss prospect. This is because customer provisioning has used the concep of over-booking, which contains implicit assumptions about customer bandwidth demand. No measurements of link utilization were used to drive provisioning. Satisfaction of customer bandwidth demand was measure in a loose fashion by monitoring average hourly uplink utilization and comparing this to a static threshold, set by experience. To overcome this problem, a system 24, in accordance with the present invention, verifies customer bandwidth fulfillment on the Access Routers (ARs) $14_1$, $14_2$ and $14_3$ on a substantially continuous basis by measuring the uplink utilization on a granular level typically, every 2–5 minutes. As discussed below, the system 24 thus provide a predictive method for maintaining customer bandwidth fulfillment while making appropriate decision on provisioning, capacity management, re-homing customers, and up grading backbone configurations.

The system 24 includes a processor 26 and an associated database 28 that stores utilizatiozn information for the uplinks 19 associated with the ARs $14_1 14_2$ and $14_3$ in the backbone node 12. The processor 26 collects granular measurements (e.g., measurements every 2–5 minutes) o the utilization of the uplinks 19 within the backbone node 12 in a manner known in the art. As discussed in detail belowv, by measuring the actual mean uplink utilization and comparing that to a prescribed threshold utilization value stored in the dataoase 28, the pocessor 26 can monitor customer bandwidth fulfillment. In response to an incrase in uplink utilization beyond the calculated threshold, the entity responsible for maintaining the node 12 can take appropriate action to restore bandwidth fulfillment, such as by provisioning an additional uplink, making a hardware upgrade or migrating customers. Based on such uplink utilization measurements, the processor 26 advantageously can determine whether a new customer can be provisioned on a given access router without any violation of bandwidth fulfillment for existing customers.

Figure 2:
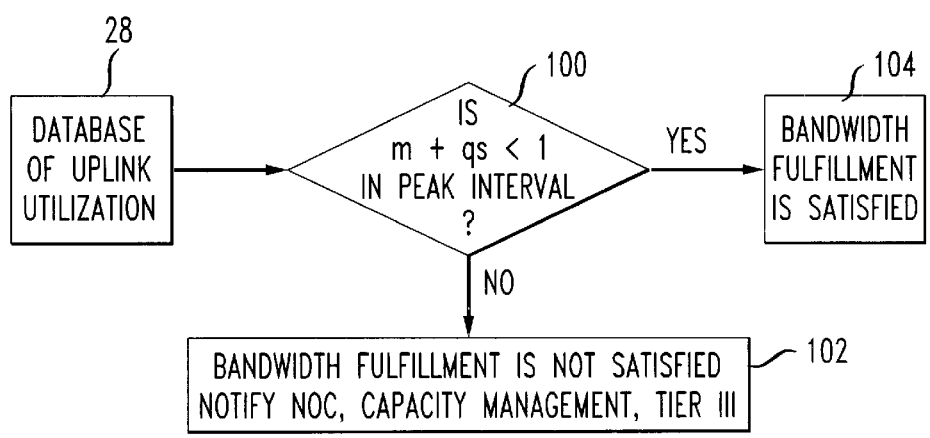
FIG. 2 illustrates a flow chart represntation of the steps executed by the apparatus of FIG. 1 to monitor bandwidth fulfillment.

FIG. 2 depicts in flow chart form the process by which the processor 26 of FIG. 1 calculates bandwidth fulfillment. As indicated previously, the processor 26 of FIG. 1 collect granular measurements of the utilization of the uplinks 19 of FIG. 1 (e.g. every 2–5 minutes). Using a given confidence level and the granular measurements of the uplink utilization as input data, the procerror 26 calculates a threshold for mean router uplink utilization. Every hour, the processor 24 executes step 100 during which it verifies access fulfilment (i.e., bandwidth fulfillment at the access router) by verifying the inequality.

$$m+qs<1 \quad \text{(Equation 1)}$$

wherein m and $s^2$ are empirical values for mean and variance, respectively, calculated from the measurements of the link utilization during the hour, and wherein $q=q_\alpha$ defined by equation $\Phi(q_\alpha)=1-\alpha$ where $\Phi(x)$ is the standard normal distribution with mean=0 and variance=1, and $\alpha$ is a parameter between 0 and 1 defined by desired confidence level $(1-\alpha) \times 100\%$. The calculated threshold for mean uplink utilization is given by 1-qs . Though the inequality is checked every hour, decisions about fulfillment violations will be made based on the peak hour for the day. Historical hourly data will be retained for trending purposes.

If the inequality in Equation 1 is not satisfied, then the access fulfillment is violated. Stated another way, the aggregated customer bandwidth demand exceeds the uplink capacity. In such a case, step 102 is executedand appropriate organizations of the service provider responsible for the node 12 of FIG. 1, such as the Network Operations Center (NOC), Capacity Management, and Tier III Support, receive a notification of the access fulfillment violation. Routers within the node 12 of FIG. 1 that experience consistent violations of access fulfillment now become candidates for provisioning of an additional uplink, a hardware upgrade and/or customer migration.

Figure 3:
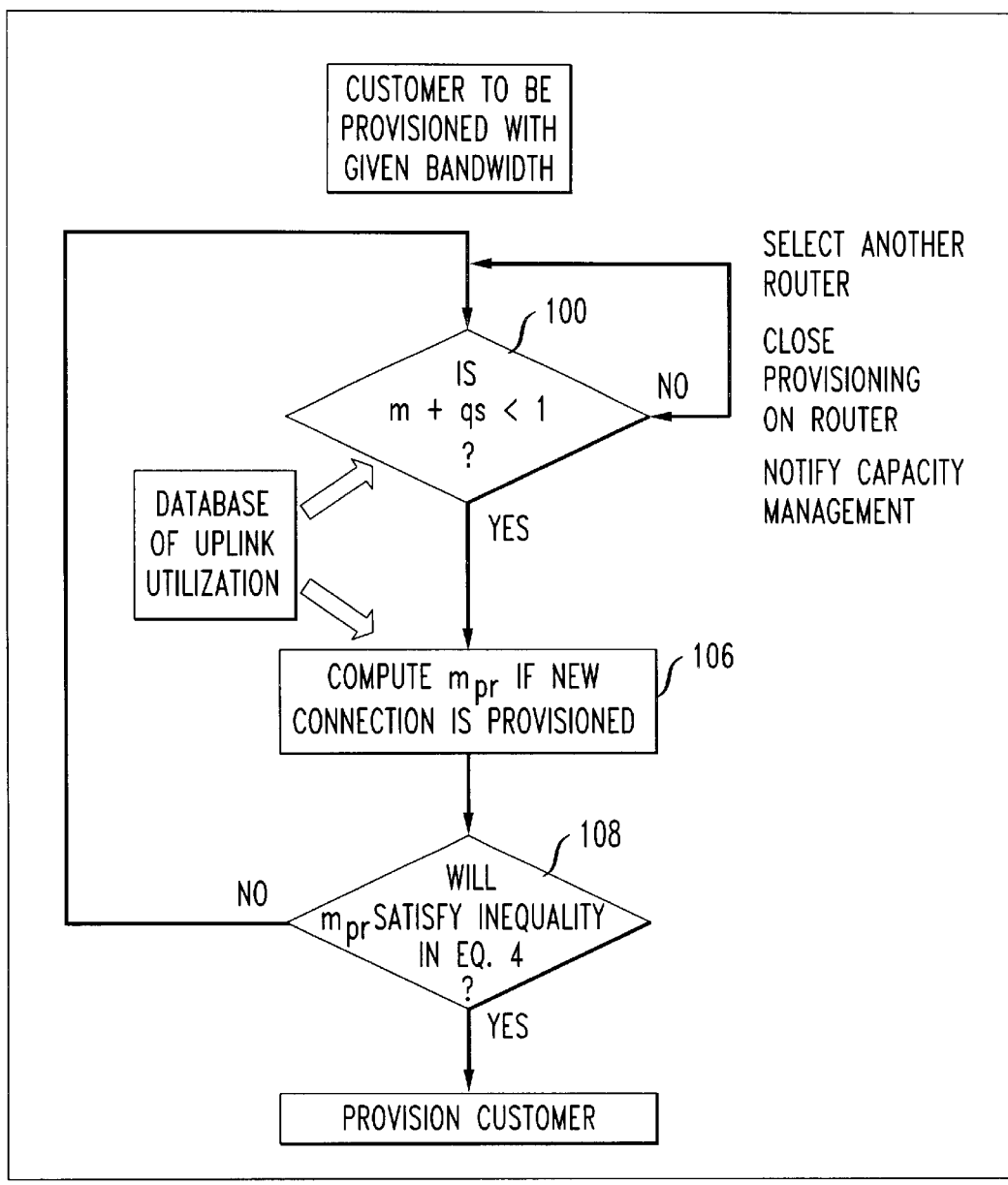
FIG. 3 illustrates a flow chart representation of the steps executed by the aparatus of FIG. 1 to determine whether to provision a new customer or an acess router in the network of FIG. 1.

If the inequality m+qs<1 is satisfied, then step 104 is executed, whereupon the processor 26 of FIG. 1 indicates that the bandwidth fulfillment is satisfied. With the bandwidth access satisfied, the processor 26 may then proceed to determine whether to provision a new customer according to the process of FIG. 3. Referring to FIG. 3, the process of determining whether to provision a new commences upon execution of step 106 following step 100 at which time the processor 26 of FIG. 1 computes a predicted uplink utilization value $m_{pr}$. The value $m_{pr}$ represents the expected uplink utilization following provisioning of a new customer and is calculated in the following manner. The previous months' (weeks') mean uplink utilization, as calculated from granular (i.e., 2–5 minute) measurements in the peak interval, is fit by a regression model to predict a value $m_x$ for x months ahead. The total access bandwidth of currently provisioned customers on the router measured in the units of access bandwidth for the new customer is given by $$n = \frac{\text{currently provisioned access bandwidth}}{\text{bandwidth of new customer}} \quad \text{(Equation 2)}$$

The predicted uplink utiliztion is then given by $$m_{pr} = m_x + \frac{m_x}{n} \quad \text{(Equation 3)}$$

The actual decision whether to add a new customer is made during step 108 by verifying the inequality:

$$m_{pr} + qs\sqrt{\frac{m_{pr}}{m}} < 1 \quad \text{(Equation 4)}$$

wherein parameters m, s, and q are defined in the same way as in Equation 1. If the inequality in Equation 4 is satisfied then the new customer can be provisioned. If the inequality in Equation 4 is violated, then all provisioning on that router should be closed with notification to Capacity Management, and another router for provisioning should be selected. Thereafter, step 100 is re-executed as discussed with respect to FIG. 2.

The method of the present invention can be directly used for monitoring fulfillment at hub and backbone routers, as long as the uplinks are clearly defined. For a hub router, such as HR 18$_1$, all links 21 between the hub and backbone routers are considered uplinks. For a backbone router, such as BR 22$_1$ all links 23 to another backbone routers are considered uplinks. The method of the present invention can include the step of planning for allocation of spare ports at access, hub and backbone routers that may be required for capacity upgrade in response to increasing customer demand. in addition, the method of the present invention can include the step of predicting fulfillment in redundant access architecture under failure scenarios when one of the uplinks or hub routers fails. The foregoing describes a technique for monitoring an IP data network to verify whether customer bandwidth demand (as constrained by access bandwidth limitations) is satisfied, as well as to determine whether to provision additional customers.

The above-described embodiments merely illustrate the principles of the invention. Those skilled in the art may make various modifications and changes that will embody the principles of the invention and fall within the spirit and scope thereof.

What is claimed is:

1. A method for monitoring an IP data network within which there is at least one access router connected by at least one uplink to another backbone element, comprising the steps of:

measuring, on a granular basis, the bandwidth utilization of each uplink which connects the access router to said other element; and verifying bandwidth fulfillment at each access router by comparing the measured mean uplink utilization to a prescribed threshold value, wherein the bandwidth fulfillment is determined in accordance with inequality m+qs<1, with m and $s^2$ being empirical values for mean and variance, respectively, calculated from the measurements of the uplink utilization during peak time intervals, and with $q=q_\alpha$, where $q_\alpha$ is defined by $\Phi(q_\alpha)=1-\alpha$ where $\Phi(x)$ is the standard normal distribution with mean=0 and variance=1, and $\alpha$ is a parameter between 0 and 1 defined by a desired confidence level $(1-\alpha) \times 100\%$.

2. The method according to claim 1 wherein the prescribed threshold value for the mean uplink bandwidth utilization is given by 1−qs.

3. A method for monitoring an IP data network within which there is at least one access router connected by at least one uplink to another backbone element, comprising the steps of:

measuring, on a granular basis, the bandwidth utilization of each uplink which connects the access router to said other element; and verifying bandwidth fulfillment at each access router by comparing the measured mean uplink utilization to a prescribed threshold value, wherein if the fulfillment remains below the prescribed threshold value, then performing the step of:

determining if a new customer can be provisioned on the access router by establishing a predicted mean uplink utilization in accordance with mean bandwidth usage of existing customers and required bandwidth of the new customer and comparing whether the predicted mean uplink utilization remains below a threshold value, wherein the predicted uplink utilization ($m_{pr}$) is established in accordance with the relationship:

$$m_{pr} = m_x + \frac{m_x}{n}$$

wherein n is given by the relationship:

$$n = \frac{\text{currently provisioned access bandwidth}}{\text{bandwidth of new customer}}$$

and $m_x$ is obtained from the granular bandwidth measurements in the peak interval by fitting a regression model to predict the $m_x$ for x months ahead.

4. A method for monitoring an IP data network within which there is at least one access router connected by at least one uplink to another backbone element, comprising the steps of:

measuring, on a granular basis, the bandwidth utilization of each uplink which connects the access router to said other element; and verifying bandwidth fulfillment at each access router by comparing the measured mean uplink utilization to a prescribed threshold value, wherein if the fulfillment remains below the prescribed threshold value, then performing the step of:

determining if a new customer can be provisioned on the access router by establishing a predicted mean uplink utilization in accordance with mean bandwidth usage of existing customers and required bandwidth of the new customer and comparing whether the predicted mean uplink utilization remains below a threshold value, where the actual decision to provision the customer is made by verifying the inequality $$m_{pr} + qs\sqrt{\frac{m_{pr}}{m}} < 1$$

and wherein if the inequality is satisfied then the new customer is provisioned, but if the inequality is violated then all provisioning on that router should be closed.

5. A method for determining whether to provision a new customer on an access router coupled by at least one uplink to a backbone and accessed by existing customers via at least one downlink, comprising the steps of:

measuring the utilization of each uplink, which connects the access router to the backbone;

verifying bandwidth fulfillment at each access router in accordance with uplink utilization, and if mean uplink utilization remains below a prescribed threshold value, then determining if a new customer can be provisioned by establishing predicted mean uplink utilization in accordance with mean bandwidth usage of existing customers and required bandwidth of the new customer and comparing whether the predicted mean uplink utilization remains below a prescribed threshold value, wherein the bandwidth fulfillment is determined in accordance with inequality m+qs<1, with m and $s^2$ being empirical values for mean and variance, respectively, calculated from the measurements of the uplink utilization during peak time intervals, and with $q=q_\alpha$, where $q_\alpha$ is defined by $\Phi(q_\alpha)=1-\alpha$ where $\Phi(x)$ is the standard normal distribution with mean=0 and variance=1, and $\alpha$ is a parameter between 0 and 1 defined by a desired confidence level $(1-\alpha)\times 100\%$.

6. The method according to claim 5 wherein the prescribed threshold value for the mean uplink utilization is given by 1−qs.

7. A method for determining whether to provision a new customer on an access router coupled by at least one uplink to a backbone and accessed by existing customers via at least one downlink, comprising the steps of:

measuring the utilization of each uplink, which connects the access router to the backbone;

verifying bandwidth fulfillment at each access router in accordance with uplink utilization, and if mean uplink utilization remains below a prescribed threshold value, then determining if a new customer can be provisioned by establishing predicted mean uplink utilization in accordance with mean bandwidth usage of existing customers and required bandwidth of the new customer and comparing whether the predicted mean uplink utilization remains below a prescribed threshold value, wherein the predicted mean uplink utilization ($m_{pr}$) is established in accordance with the relationship:

$$m_{pr} = m_x + \frac{m_x}{n}$$

wherein n is given by the relationship:

$$n = \frac{\text{currently provisioned access bandwidth}}{\text{bandwidth of new customer}}$$

and $m_x$ is obtained from the granular bandwidth measurements in the peak interval by fitting a regression model to predict the $m_x$ for x months ahead.

8. A method for determining whether to provision a new customer on an access router coupled by at least one uplink to a backbone and accessed by existing customers via at least one downlink, comprising the steps of:

measuring the utilization of each uplink, which connects the access router to the backbone;

verifying bandwidth fulfillment at each access router in accordance with uplink utilization, and if mean uplink utilization remains below a prescribed threshold value, then determining if a new customer can be provisioned by establishing predicted mean uplink utilization in accordance with mean bandwidth usage of existing customers and required bandwidth of the new customer and comparing whether the predicted mean uplink utilization remains below a prescribed threshold value, where the actual decision to provision the customer is made by verifying the inequality $$m_{pr} + qs\sqrt{\frac{m_{pr}}{m}} < 1$$

and wherein if the inequality is satisfied then the new customer is provisioned, but if the inequality is violated then all provisioning on that router should be closed.

* * * * *